US012520828B2

(12) United States Patent
Himes et al.

(10) Patent No.: US 12,520,828 B2
(45) Date of Patent: Jan. 13, 2026

(54) HOME AQUARIUM AND METHODS

(71) Applicant: Spectrum Brands, Inc., Middleton, WI (US)

(72) Inventors: William D. Himes, Radford, VA (US); William Nathan Brunner, St. Peters, MO (US); Catherine A. Langford, Blacksburg, VA (US)

(73) Assignee: Spectrum Brands, Inc., Middleton, WI (US)

( * ) Notice: Subject to any disclaimer, the term of this patent is extended or adjusted under 35 U.S.C. 154(b) by 75 days.

(21) Appl. No.: 18/121,772

(22) Filed: Mar. 15, 2023

(65) Prior Publication Data
US 2023/0292717 A1   Sep. 21, 2023

Related U.S. Application Data

(60) Provisional application No. 63/319,899, filed on Mar. 15, 2022.

(51) Int. Cl.
*A01K 63/06* (2006.01)
*A01K 63/00* (2017.01)
(Continued)

(52) U.S. Cl.
CPC ............ *A01K 63/06* (2013.01); *A01K 63/006* (2013.01); *A01K 63/045* (2013.01); *A01K 63/047* (2013.01); *H02G 3/083* (2013.01)

(58) Field of Classification Search
CPC .... A01K 63/06; A01K 63/006; A01K 63/045; A01K 63/047; A01K 63/00; A01K 63/003; H02G 3/08; H02G 3/081; H02G 3/083
See application file for complete search history.

(56) References Cited

U.S. PATENT DOCUMENTS

| 4,082,062 A | 4/1978 | Rodemeyer |
| 4,866,215 A * | 9/1989 | Muller ................. H01R 13/72 |
| | | 439/449 |

(Continued)

FOREIGN PATENT DOCUMENTS

| CN | 2927616 Y | 7/2007 |
| CN | 202269280 U | 6/2012 |

(Continued)

OTHER PUBLICATIONS

CN-202733687-U Translation (Year: 2013).*

(Continued)

*Primary Examiner* — Katelyn T Truong
(74) *Attorney, Agent, or Firm* — Merchant & Gould P.C.

(57) ABSTRACT

An aquarium requiring no more than only a single power connection. The aquarium includes: (a) a transparent tank having a surrounding wall with an enclosure rim surrounding an open top and an opposite closed bottom wall; (b) an electrically powered lighting arrangement; (c) an electrically powered pump oriented within an interior of the tank; (d) a base supporting the tank under the bottom wall of the tank; and (e) a junction box integrally formed with the base and having an aperture arrangement accessible from adjacent the surrounding wall having an electrical power port for removable insertion of an electrical power cord to provide power for the lighting arrangement and the pump.

13 Claims, 6 Drawing Sheets

(51) Int. Cl.
    *A01K 63/04*   (2006.01)
    *H02G 3/08*   (2006.01)

(56) References Cited

U.S. PATENT DOCUMENTS

| | | | |
|---|---|---|---|
| 5,306,421 A | 4/1994 | Weinstein | |
| 6,484,669 B1 * | 11/2002 | Mihlbauer | A01K 63/006 |
| | | | 119/245 |
| 6,960,003 B2 | 11/2005 | Takano | |
| 7,741,953 B2 | 6/2010 | Yuasa | |
| 7,886,696 B2 | 2/2011 | Marks et al. | |
| 7,919,712 B2 * | 4/2011 | Mori | H01R 13/518 |
| | | | 361/728 |
| 8,453,605 B2 | 6/2013 | Tominaga et al. | |
| 9,247,622 B2 | 1/2016 | Fredricks | |
| 9,282,728 B2 | 3/2016 | Reid et al. | |
| 9,488,364 B2 | 11/2016 | Chien | |
| 10,285,386 B2 | 5/2019 | Zinno | |
| 10,638,731 B2 | 5/2020 | Reid | |
| 11,129,371 B1 * | 9/2021 | Hollis | A01K 63/006 |
| 11,178,858 B2 * | 11/2021 | Yu | A01K 63/003 |
| 2008/0236858 A1 * | 10/2008 | Quijano | G06F 1/181 |
| | | | 174/50 |
| 2009/0051563 A1 | 2/2009 | Kuo et al. | |
| 2009/0199779 A1 | 8/2009 | Parks | |
| 2009/0229533 A1 | 9/2009 | Marks et al. | |
| 2014/0223819 A1 | 8/2014 | Coghlan | |
| 2015/0000607 A1 * | 1/2015 | Reid | A01K 63/045 |
| | | | 119/248 |
| 2015/0272088 A1 | 10/2015 | Woodward | |
| 2018/0064072 A1 * | 3/2018 | Chattin | A01K 63/003 |
| 2018/0192621 A1 | 7/2018 | Valatka et al. | |
| 2018/0274776 A1 * | 9/2018 | Chien | A63H 3/003 |
| 2018/0279589 A1 | 10/2018 | Watson et al. | |
| 2019/0059340 A1 | 2/2019 | Brown | |
| 2021/0251161 A1 * | 8/2021 | Croteau | A01G 9/18 |

FOREIGN PATENT DOCUMENTS

| | | | | |
|---|---|---|---|---|
| CN | 202733687 U | * | 2/2013 | A01K 63/06 |
| CN | 104703007 A | | 6/2015 | |
| CN | 206213021 U | | 6/2017 | |
| CN | 209376382 U | | 9/2019 | |
| DE | 2833969 A1 | | 2/1980 | |
| EP | 558849 B1 | | 7/1996 | |
| GB | 1497393 A | | 1/1978 | |
| JP | 11289908 A | | 10/1999 | |
| KR | 101698643 B1 | | 1/2017 | |
| WO | 2014083231 A1 | | 6/2014 | |
| WO | 2017098241 A2 | | 6/2017 | |
| WO | WO-2020101079 A1 | * | 5/2020 | |

OTHER PUBLICATIONS

WO-2020101079-A1 Translation (Year: 2020).*
International Search Report and Written Opinion from PCT/US2023/064225 mailed Jul. 7, 2023, 29 pages.

* cited by examiner

HOME AQUARIUM AND METHODS

This application claims priority to U.S. provisional patent application 63/319,899, filed Mar. 15, 2022 and is incorporated herein by reference.

TECHNICAL FIELD

This disclosure relates to a home aquarium and methods. In particular, this disclosure relates to a convenient and easily set-up aquarium and methods of powering accessories for the aquarium.

BACKGROUND

Home aquariums are a popular hobby. People enjoy keeping fish and other aquatic animals in an aquarium for relaxation, enjoyment, and education.

Most aquariums include accessories, such as a pump and lighting. These accessories are typically electrically powered. In typical systems, each of these accessories have their own power cord, which needs to be routed and connected to a power strip or electrical outlet. The various cords can be both unsightly, as well as potentially dangerous if exposed to water in the aquarium tank. In addition, setting up the aquarium takes time to get the accessories arranged properly, as well as getting the power cords connected and routed.

Improvements are desirable.

SUMMARY

In general, an aquarium is provided which improves the prior art.

In one aspect, an aquarium is provided which is requires no more than only a single power connection.

In one aspect, a home aquarium is provided comprising: (a) a transparent tank having a surrounding wall with an enclosure rim surrounding an open top and an opposite closed bottom wall; the surrounding wall and bottom wall define an interior volume for holding water; (b) an electrically powered lighting arrangement; (c) an electrically powered pump oriented within an interior of the tank; (d) a base supporting the tank under the bottom wall of the tank; and (e) a junction box integrally formed with the base and having an aperture arrangement accessible from adjacent the surrounding wall having an electrical power port for removable insertion of an electrical power cord to provide power for the lighting arrangement and the pump.

In preferred embodiments, the aquarium further includes a lid removably covering the open top; the electrically powered lighting arrangement being secured to the lid.

In example arrangements, the aperture arrangement of the junction box further includes first and second cable connection ports.

Some embodiments can further include (a) a first cable connecting the first cable connection port and the lighting arrangement; and (b) a second cable connecting the second cable connection port and the pump.

In examples, the aperture arrangement in the junction box includes no more than a single electrical power port.

In one or more embodiments, the aperture arrangement in the junction box includes no more than 3 apertures for receiving cables or power cords.

In some implementation, there is no more than a single electrical power port.

Some examples will have the tank surrounding wall comprising a front wall, rear wall, left side wall, and right side wall.

The aperture arrangement of the junction box can be made to be accessible from adjacent the rear wall of the tank.

In some embodiments, there further includes a remote control programmed to control electrical functions in the aquarium.

In some implementations, there further includes an integral holder for the remote control.

The base can include an integral slot sized to removably hold the remote control under the bottom wall of the tank.

In some examples, the integral slot in the base is adjacent the front wall of the tank.

In one or more embodiments, there further includes a filter arrangement downstream of the pump.

Some examples provide the filter arrangement including a filter housing holding a removable and replaceable filter cartridge.

In some implementations, there further includes a back panel covering the pump and filter housing and being against the surrounding wall of the tank.

Example embodiments can include (a) the pump having an inlet adjacent the bottom wall, and an outlet in the filter housing; and (b) the filter housing having a filtered water outlet adjacent the open top.

In another aspect, a method of powering accessories in an aquarium is provided; the tank having a surrounding wall with an enclosure rim surrounding an open top and an opposite closed bottom wall; and a frame holding the tank underneath the tank; the method comprising: (a) connecting an end of an electrical cord into an electrical port in a junction box integral with the frame, the junction box including at least first and second cable ports with cables connecting the cable ports to the accessories; and (b) plugging an opposite end of the electrical cord into a power outlet.

Example methods include the electrical power port being the only power port in the aquarium; and the accessories including lights and a pump; and the step of plugging the opposite end of the electrical cord into the power outlet includes powering the lights and the pump.

Example methods further include controlling the accessories with a remote control; the aquarium including a holder for the remote control.

Example methods further include removably storing the remote control in an integral slot in the frame under the tank.

A variety of examples of desirable product features or methods are set forth in part in the description that follows, and in part will be apparent from the description, or may be learned by practicing various aspects of this disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Figure 1:
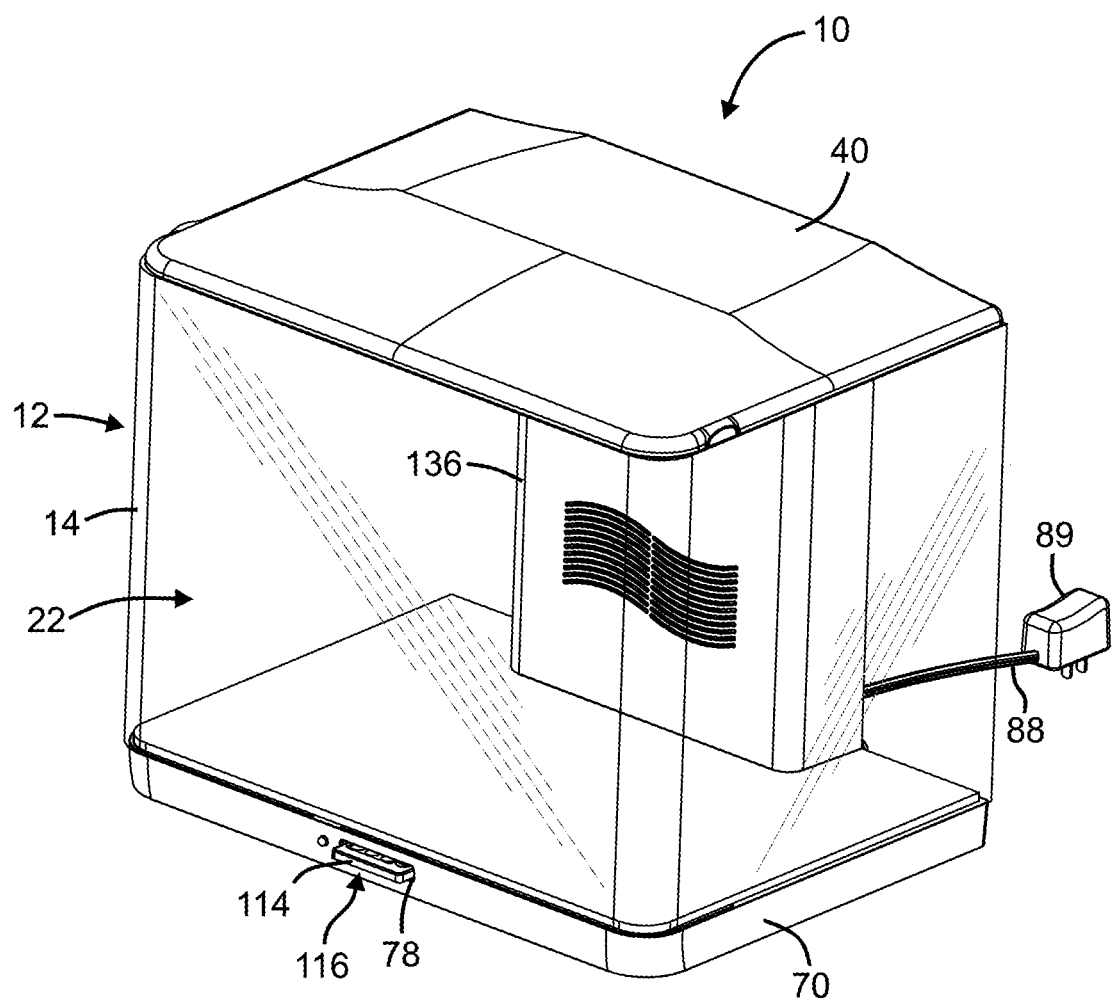
FIG. 1 is a perspective view of a home aquarium, constructed in accordance with principles of this disclosure.

A home aquarium is shown in the drawings and depicts an example embodiment of a "plug and play" aquarium. By "plug and play", it is meant that at least two powered accessories are set up in the aquarium, and the consumer need only plug in a single power cord to have the aquarium accessories powered for operation. The accessories can include a variety of aquarium accessories. In the example embodiments shown in the drawings, the accessories are a pump and lighting. Additional accessories can including heaters or feeders.

In reference now to FIG. 1, an aquarium is shown at 10. The aquarium 10 is the type typically used in homes (i.e., non-commercial settings). The aquarium 10 can be used for keeping aquatic animals (e.g., fish), plants, etc.

Figure 4:
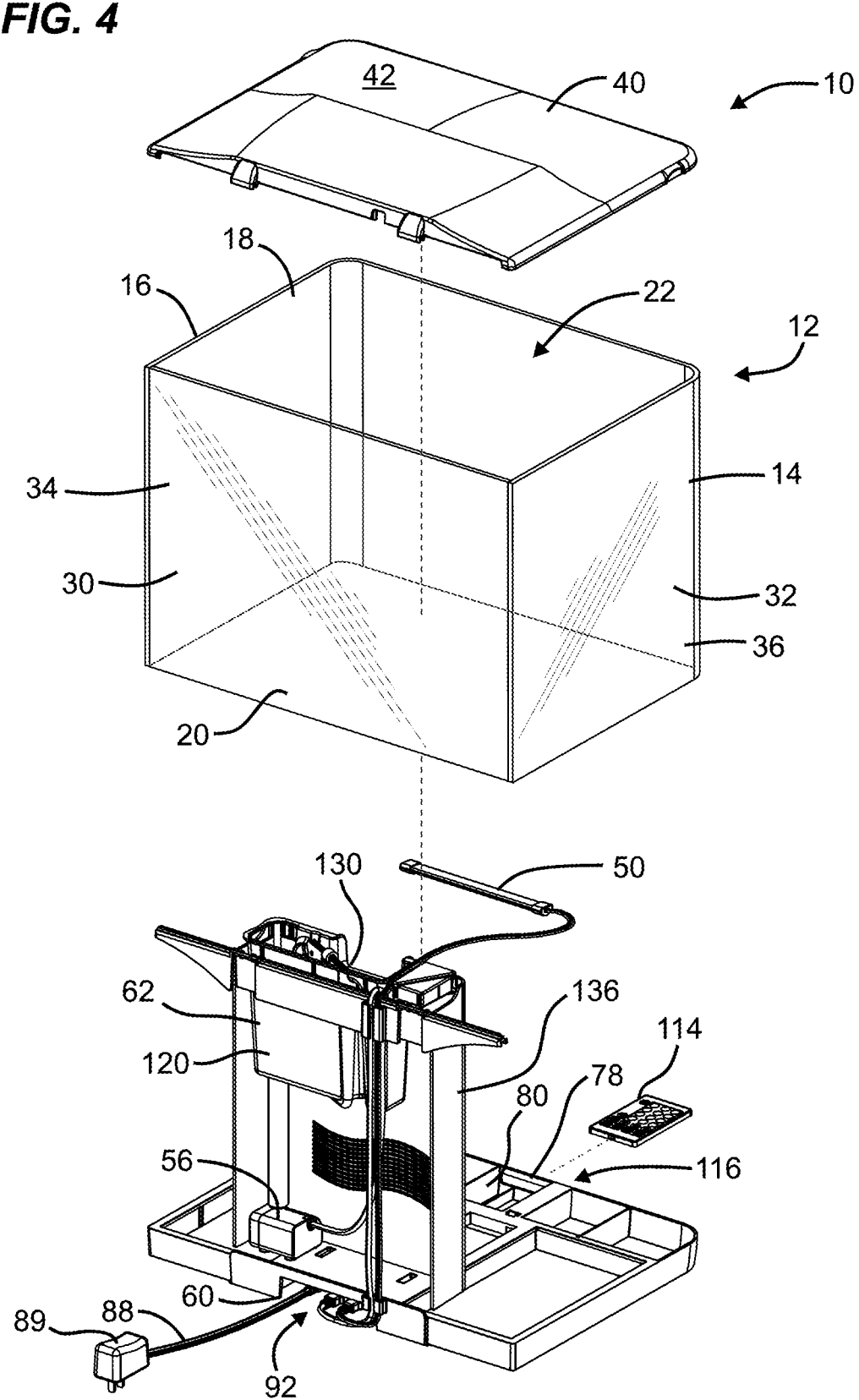
FIG. 4 is an exploded perspective view of the aquarium of FIGS. 1 and 2.
Figure 5:
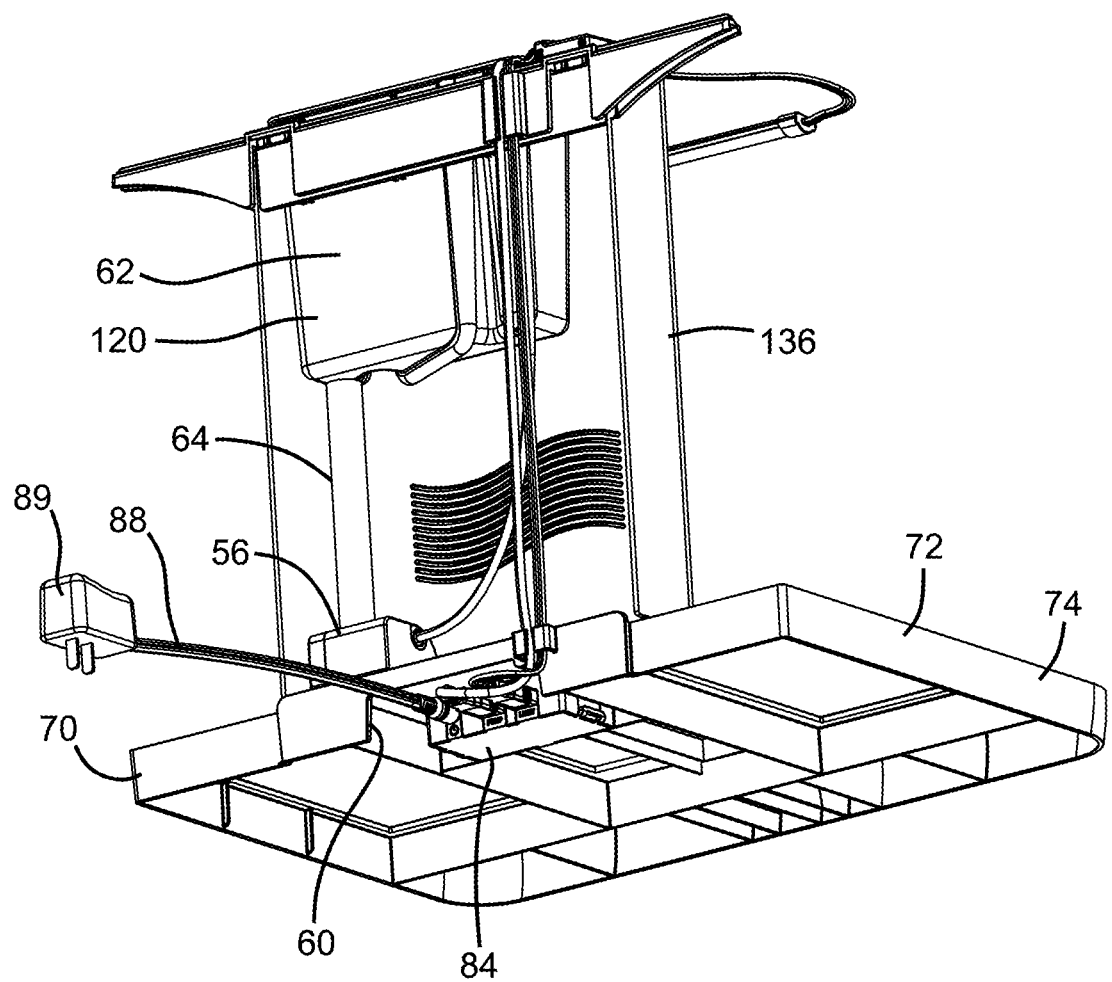
FIG. 5 is a perspective view of a portion of the aquarium of FIG. 1.

The aquarium 10 has a tank 12. The tank 12 is typically transparent, made from glass or plastic. In FIG. 4, the tank 12 has a surrounding wall 14 with an enclosure rim 16 surrounding an open top 18 and an opposite closed bottom wall 20. The surrounding wall 14 and bottom wall 20 define an interior volume 22 for holding water. Typical sizes for a home use tank 12 are from 2.5-15 gallons for small tanks; 15-45 gallons for medium tanks; and 45-225 gallons for large tanks. The systems described herein can be used for any of small, medium, or large tanks 12.

The tank 12 can be made from, typically, transparent materials including glass or polystyrene.

The tank 12 can be many shapes, and preferably, is rectangular shaped. As such, the surrounding wall 14 includes a front wall 30, an opposite rear wall 32, with a left side wall 34 and opposite right side wall 36 extending between the front wall 30 and rear wall 32. The terminal ends of the front wall 30, rear wall 32, left side wall 34, and right side wall 36 define the enclosure rim 16. Typically, the front wall 30, rear wall 32, left side wall 34, and right side wall 36 extend from the bottom wall 20.

Figure 2:
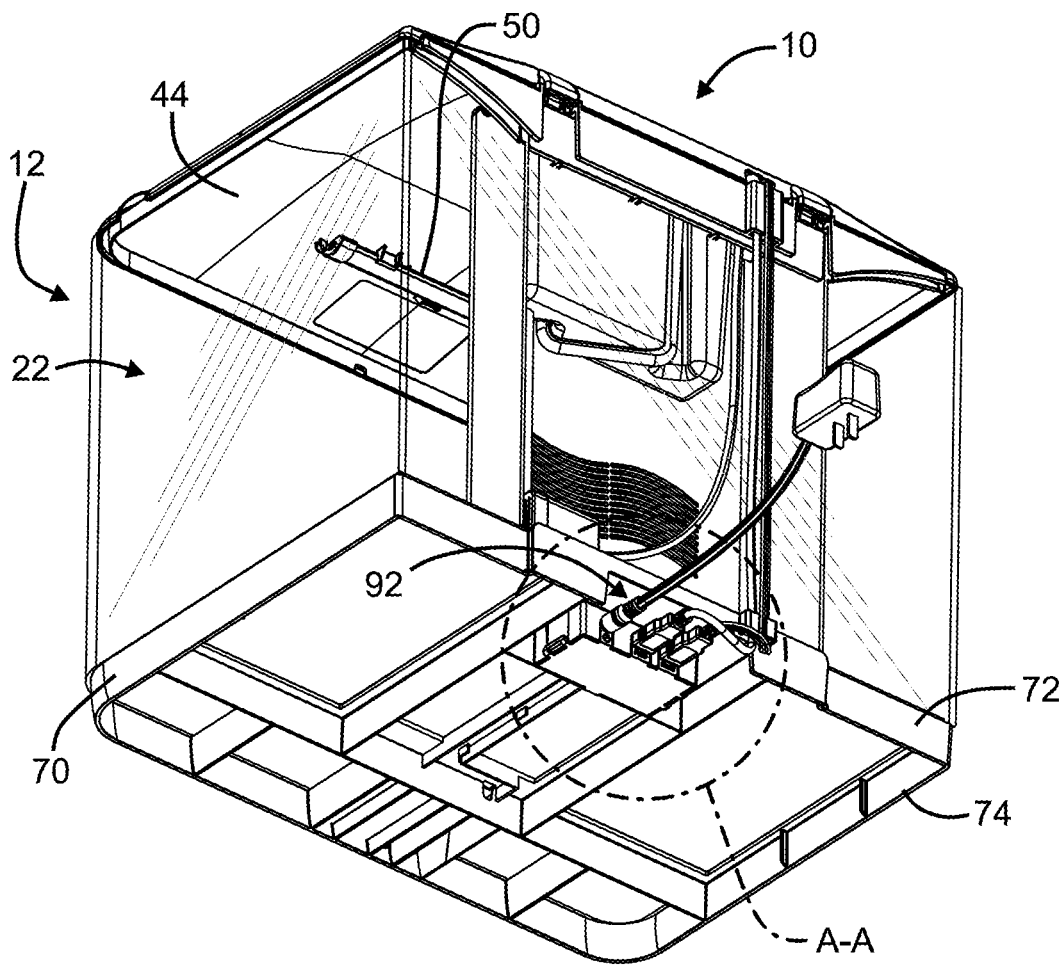
FIG. 2 is a bottom, rear perspective view of the aquarium of FIG. 1.
Figure 3:
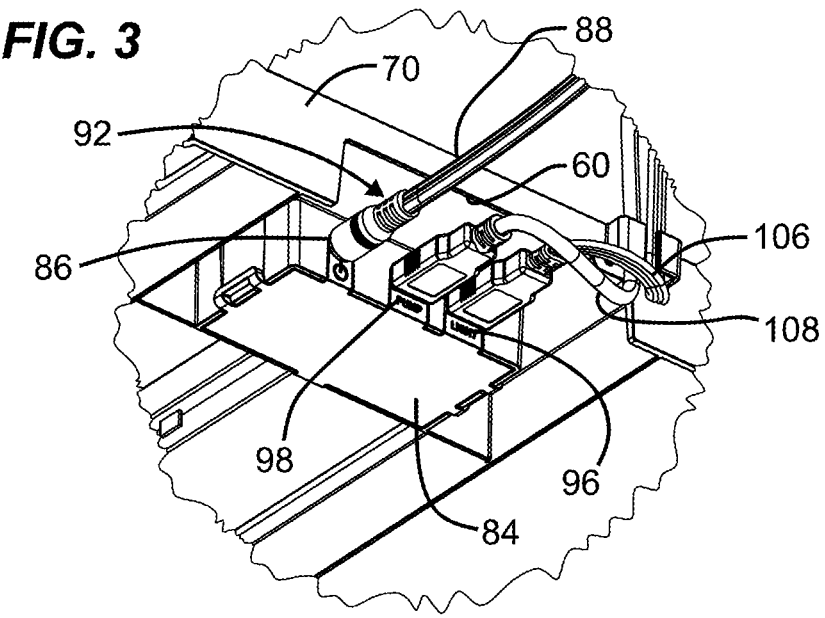
FIG. 3 is an enlarged view of section A-A of FIG. 2.

The aquarium 10 has a lid 40. The lid 40 covers the open top 18 and is typically removable to provide access to the interior volume 22. The lid 40 can be hingedly attached about one of the walls 30, 32, 34, 36; and/or, it may be completely removable from the tank 12. The lid 40 has an exterior portion 42 facing outside of the tank interior volume 22 and an opposite interior portion 44 (FIG. 2) facing the tank interior volume 22.

In accordance with principles of this disclosure, the aquarium 10 has an electrically powered lighting arrangement 50. The lighting arrangement 50 is secured to a portion of the aquarium 10 and is positioned to cast light into the interior volume 22.

In the example embodiment shown in the drawings, the electrically powered lighting arrangement 50 is secured to the lid 40. For example, the lighting arrangement 50 can be secured to the interior portion 44 of the lid 40.

The lighting arrangement 50 is electrically powered and includes an input 52 for power.

In accordance with principles of this disclosure, the aquarium 10 has an electrically powered pump 56 oriented within the interior volume 22 of the tank 10. The pump 56 helps to move water through a filter arrangement. The pump 56 also provides water agitation.

Figure 6:
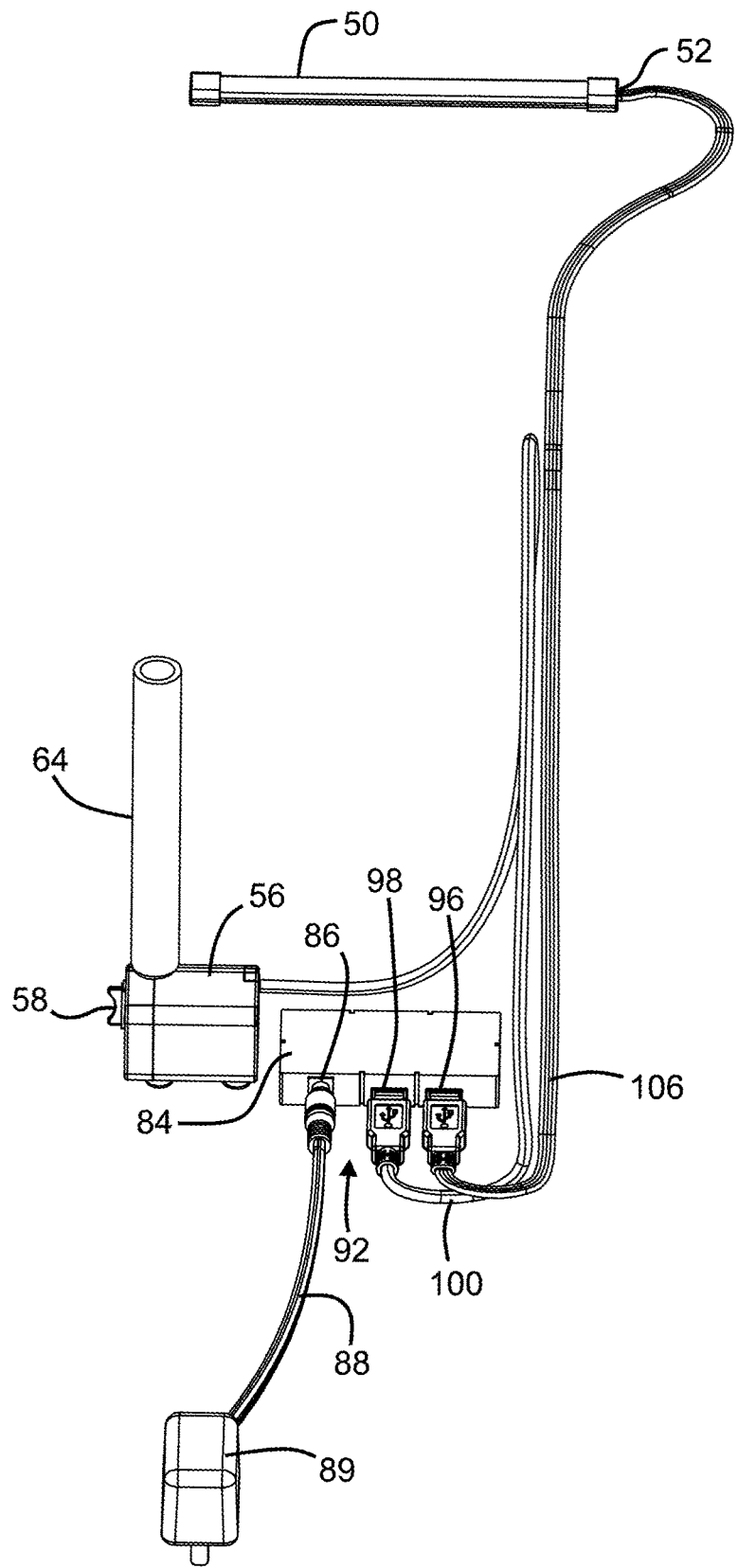
FIG. 6 is a front elevational view of a portion of FIG. 5.

The pump 56 has an inlet 58 adjacent the bottom wall 20 and an outlet within a filter housing 62, discussed further below. A tube 64 connects the pump 56 to the interior of the filter housing 62, and the pumped water exits the tube 64 through a pump outlet 66 (FIG. 6), which is contained in the interior of the filter housing 62.

In accordance with principles of this disclosure, the aquarium 10 has a base 70 supporting the tank 10 under the bottom wall 20 of the tank 10. The base 70 is typically a sturdy frame 72 having an outer wall 74 with a same outer perimeter shape as the surrounding wall 14. It can be made from a variety of materials, including a hard plastic.

In FIG. 4, the base 70 can include an integral slot 78 defining an open cavity 80 located below the bottom wall 20 of the tank 10. The open cavity 80 is sized to removably hold aquarium accessories, discussed further below. In the example embodiment shown, the integral slot 78 in the base 70 is adjacent the front wall 30 of the tank 12.

In accordance with principles of this disclosure, the aquarium 10 has a junction box 84. The junction box 84 has an electrical power port 86 for removable insertion of an electrical power cord 88 to provide power for the lighting arrangement 50 and the pump 56. The power cord 88 has a conventional outlet plug 89 for connection to a power outlet.

The junction box 84 is shown in the example embodiment as being integrally formed with the base 70. The junction box 84 has an aperture arrangement 92 accessible from adjacent the surrounding wall.

In this embodiment, the aperture arrangement 92 of the junction box 84 further includes a first cable connection port 96 and a second cable connection ports 98. Typically, the aperture arrangement 92 in the junction box 84 includes no more than a single electrical power port 86.

In many embodiments, the aperture arrangement 92 includes no more than 3 apertures for receiving cables or power cords. Preferably, the aperture arrangement 92 of the junction box 84 is accessible from adjacent the rear wall 32 of the tank 10 via a slot or opening 60 for aesthetic reasons; however, it could be located anywhere about the surrounding wall 14.

In accordance with principles of this disclosure, there is a first cable 106 connecting the first cable connection port 96 and the lighting arrangement 50. There is also a second cable 108 connecting the second cable connection port 98 and the pump 56. These will typically be the only cables in the aquarium system. As such, the aquarium 10 is "plug and play", in that the consumer need only plug in the single power cord 88 to power the accessories, which in this example embodiment, are the lighting arrangement 50 and pump 56.

In accordance with principles of this disclosure, the aquarium 10 has a remote control 114 programmed to control electrical functions in the aquarium 10. For example, the remote control 114 can control the lighting arrangement 50 and the pump 56.

The aquarium 10 further includes an integral holder 116 for the remote control 114. In the example shown, the holder 116 is the slot 78 in the base 70, sized to removably hold the remote control 114 under the bottom wall 20 of the tank 12. When the slot 78 is adjacent the front wall 30, it is conveniently located for easy access by the consumer.

In accordance with principles of this disclosure, the aquarium 10 further includes a filter arrangement 120 downstream of the pump 56. The filter arrangement 120 removes impurities from the tank water.

The filter arrangement 120 includes a filter housing 62 holding a removable and replaceable filter cartridge 126. As mentioned above, the pump 56 has outlet 66 within the filter housing 62. The filter housing 62 has a filtered water outlet 130 (FIG. 4) adjacent the open top 18.

In accordance with principles of this disclosure, the aquarium 10 further includes a back panel 136 covering the pump 56 and filter housing 124. The back panel 136 is positioned against the surrounding wall 14 of the tank 12. In this example, the back panel 136 is positioned against the rear wall 32.

Figure 7:
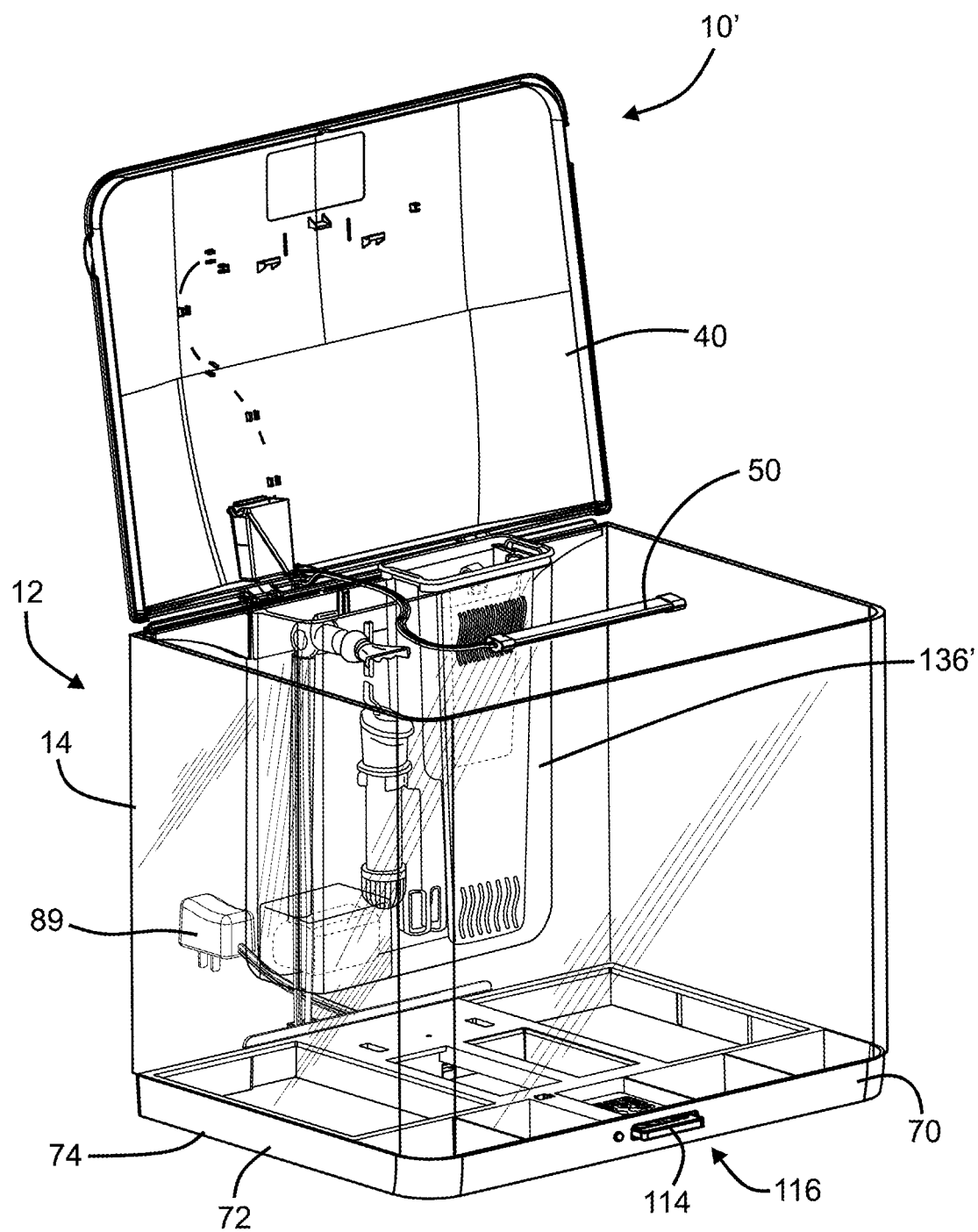
FIG. 7 is a front perspective view of the home aquarium of FIG. 1, but having a different back panel.

In FIG. 7, the aquarium 10' is shown with a different embodiment of a back panel 136'. The back panel 136' provides the same function as panel 136 in covering the pump 56 and filter housing 124. In this example, the back panel 136' is positioned against the rear wall 32. All other components of the aquarium 10' are the same as aquarium 10 of FIGS. 1-6.

The above system and components can be used in a method of powering accessories in an aquarium. The method includes a step of connecting an end of an electrical cord into an electrical port in a junction box integral with the frame, the junction box including at least first and second cable ports with cables connecting the cable ports to the accessories. For example, the cord 88 can be connected into electrical port 86 in the junction box 84. The junction box 84 includes first port 96 and second port 98 with cables 106, 108 connecting the ports 96, 98 to accessories.

The method can include plugging an opposite end of the electrical cord into a power outlet. For example, the plug 89 of cord 88 can be plugged into a power outlet.

In example methods, the electrical power port 86 is the only power port in the aquarium 10; and the accessories including lights 50 and pump 56; the step of plugging the opposite end of the electrical cord 88 into the power outlet includes powering the lights 50 and the pump 56.

The method can further including controlling the accessories with a remote control; the aquarium including a holder for the remote control. For example, the pump 56 and lights 50 can be controlled with remote control 114. The remote control 114 is removably held (or stored) in the slot 78 in the frame 72 under the tank 12.

The above represents example principles. Many embodiments can be made using these principles.

What is claimed is:

1. A home aquarium comprising:
   (a) a transparent tank having a surrounding wall with an enclosure rim surrounding an open top and an opposite closed bottom wall; the surrounding wall and bottom wall define an interior volume for holding water;
   (b) an electrically powered lighting arrangement secured to a portion of the aquarium and positioned to cast light into the interior volume;
   (c) an electrically powered pump oriented within an interior of the tank;
   (d) a base supporting the tank under the bottom wall of the tank; the base having an outer wall;
   (e) a unitary junction box integrally formed with the base as a single-piece structure and having an aperture arrangement contained within a single side of the junction box accessible from and recessed from the outer wall of the base, wherein the junction box and base are formed as one continuous unit; the aperture arrangement having an electrical power port for removable insertion of an electrical power cord to provide power for the lighting arrangement and the pump; the aperture arrangement also including a first cable connection port and a second cable connection port;
   wherein the base outer wall has an opening exposing and providing access to the electrical power port and the first cable connection port and the second cable connection port; and
   further including a remote control programmed to control electrical functions in the aquarium; wherein the base includes an integral slot sized to removably hold the remote control under the bottom wall of the tank; and wherein the slot for the remote control is in the outer wall of the base on a different side of the outer wall as the opening for the electrical power port, the first cable connection port, and the second cable connection port.

2. The aquarium of claim 1 further including a lid removably covering the open top; the electrically powered lighting arrangement being secured to the lid.

3. The aquarium of claim 1 further including:
   (a) a first cable connecting the first cable connection port and the lighting arrangement; and
   (b) a second cable connecting the second cable connection port and the pump;
   wherein the first and second cable connection ports are positioned adjacent to the electrical power port in a linear arrangement.

4. The aquarium of claim 1 wherein the aperture arrangement in the junction box includes no more than a single electrical power port.

5. The aquarium of claim 1 wherein the aperture arrangement in the junction box includes no more than 3 apertures for receiving cables or power cords.

6. The aquarium of claim 1 wherein the tank surrounding wall comprises a front wall, rear wall, left side wall, and right side wall; wherein the aperture arrangement is accessible through a single opening in the outer wall of the base and adjacent to the rear wall.

7. The aquarium of claim 1 wherein the integral slot in the base is adjacent the front wall of the tank.

8. The aquarium of claim 1 further including a filter arrangement downstream of the pump.

9. The aquarium of claim 8 wherein the filter arrangement includes a filter housing holding a removable and replaceable filter cartridge.

10. The aquarium of claim 9 further including a back panel covering the pump and filter housing and being against the surrounding wall of the tank.

11. The aquarium of claim 9 wherein:
   (a) the pump has an inlet adjacent the bottom wall, and an outlet in the filter housing; and
   (b) the filter housing has a filtered water outlet adjacent the open top.

12. The aquarium of claim 1, wherein the aperture arrangement in the junction box are the only electrical ports providing electrical communication to the aquarium.

13. The aquarium of claim 12, wherein all of the electrical ports in the aperture arrangement are contained within a single plane on the junction box.

* * * * *